United States Patent
Lee

(10) Patent No.: US 8,700,881 B2
(45) Date of Patent: Apr. 15, 2014

(54) CONTROLLER, DATA STORAGE DEVICE AND DATA STORAGE SYSTEM HAVING THE CONTROLLER, AND DATA PROCESSING METHOD

(75) Inventor: Tae Hack Lee, Yongin-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 635 days.

(21) Appl. No.: 12/763,616

(22) Filed: Apr. 20, 2010

(65) Prior Publication Data
US 2010/0274952 A1 Oct. 28, 2010

(30) Foreign Application Priority Data
Apr. 22, 2009 (KR) .................. 10-2009-0035077

(51) Int. Cl.
*G06F 12/00* (2006.01)
(52) U.S. Cl.
USPC ..... 711/206; 711/103; 711/154; 711/E12.058
(58) Field of Classification Search
USPC ........... 711/103, 162, 154, 167, E12.018, 206
See application file for complete search history.

(56) References Cited

U.S. PATENT DOCUMENTS

| 5,572,466 A | 11/1996 | Sukegawa |
| 7,711,887 B1 * | 5/2010 | Warnes et al. ................ 710/315 |
| 8,037,234 B2 * | 10/2011 | Yu et al. ......................... 711/103 |
| 8,239,724 B2 * | 8/2012 | Swing et al. ................... 714/752 |
| 2006/0285397 A1 | 12/2006 | Nishihara et al. |
| 2009/0193184 A1 * | 7/2009 | Yu et al. ......................... 711/103 |
| 2010/0082890 A1 * | 4/2010 | Heo et al. ....................... 711/103 |
| 2010/0262761 A1 * | 10/2010 | Borchers et al. .............. 711/103 |
| 2010/0293319 A1 * | 11/2010 | Lim et al. ...................... 711/103 |
| 2011/0264859 A1 * | 10/2011 | Yano et al. .................... 711/118 |

FOREIGN PATENT DOCUMENTS

| JP | 06119128 A | 4/1994 | |
| JP | 2007018499 A | 1/2007 | |
| JP | 2007048184 A | 2/2007 | |
| KR | 1020060127760 A | 12/2006 | |
| WO | WO 9323811 A2 * | 11/1993 | ............. G06F 13/16 |
| WO | WO 2009110304 A1 * | 9/2009 | |

* cited by examiner

*Primary Examiner* — Pierre-Michel Bataille
(74) *Attorney, Agent, or Firm* — Volentine & Whitt, PLLC

(57) ABSTRACT

A controller, a data storage device and a data storage system including the controller, and a data processing method are provided. The controller may process a plurality of instructions in parallel by including a plurality of address translation central processing units (CPUs) in a multi-channel parallel array structure, thereby improving the performance of a semiconductor memory system.

31 Claims, 12 Drawing Sheets

| LPN | PPN |
|-----|-----|
| 0   | 0   |
| 1   | 1   |
| 2   | 2   |
| 3   | 3   |
| 4   | 4   |
| 5   | 5   |
| 6   | 6   |
| 7   | 7   |
| 8   | 20  |
| 9   | 21  |
| 10  | 22  |
| 11  | 23  |
| 12  | 15  |
| ⋮   | ⋮   |

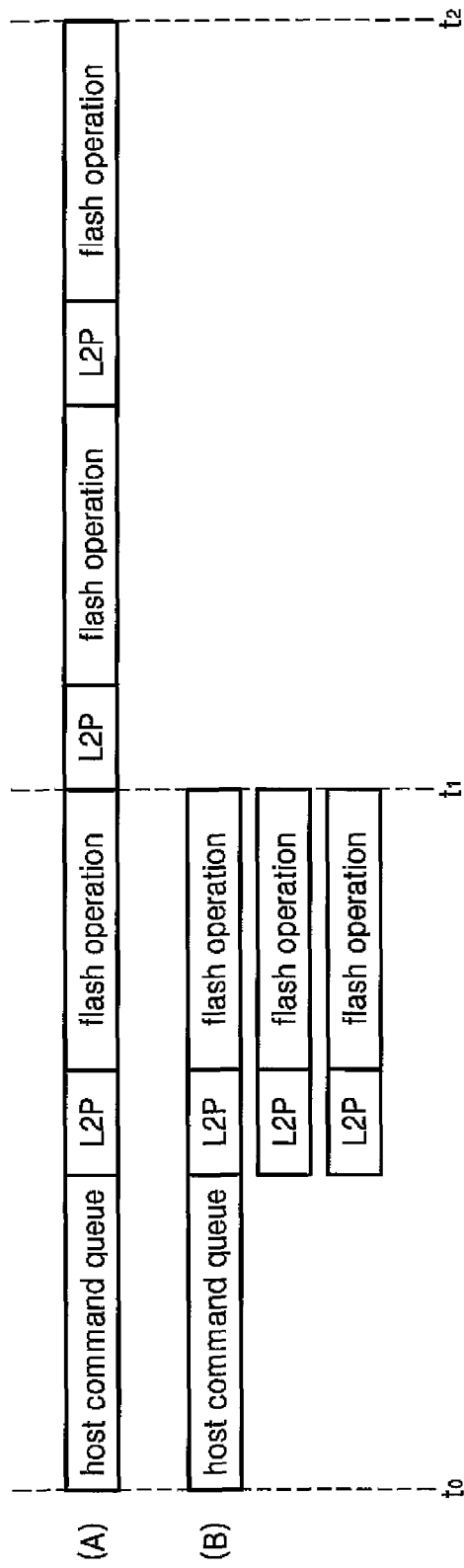

CONTROLLER, DATA STORAGE DEVICE AND DATA STORAGE SYSTEM HAVING THE CONTROLLER, AND DATA PROCESSING METHOD

CROSS-REFERENCE TO RELATED APPLICATIONS

This application claims priority to Korean Patent Application No. 10-2009-0035077 filed on Apr. 22, 2009, the subject matter of which is hereby incorporated by reference.

BACKGROUND

The present inventive concept relates to storage devices, and more particularly to controllers improving the performance of semiconductor memory systems by processing a plurality of instructions in parallel by including a plurality of logical-to-physical address translation central processing units (CPUs) in a multi-channel parallel array structure. The inventive concept also relates to data storage devices and data storage systems including this type of controller, as well as associated data processing methods.

Non-volatile memory is generally characterized by an ability to retain stored data in the absence of applied power. Flash memory is one type of non-volatile memory, and is widely used in computers, memory cards, and a variety of consumer electronics because of is ability to electrically erase stored data on a relatively large block basis. As the use of portable information devices such as cellular phones, portable digital assistants (PDAs), digital cameras has become widespread, flash memory has increasingly been used to replace hard disk drives as a primary data storage component within such devices.

Contemporary flash memory may be classified as NOR flash and NAND flash memories according to the constituent connection structure between memory cells and corresponding bit lines. NOR flash memory is characterized by high speed access (reading) to stored data, but relatively slow writing speeds. As such, NOR flash memory is commonly used as code memory. In contrast, NAND flash memory is characterized by fast writing speed and a low cost per byte ratio. As such, NAND flash memory is particularly well suited for large-capacity storage devices.

Either type of flash memory provides high reading speed at relatively low cost, as compared with the other types of memory devices. However, before data may be written to a flash memory, an erase operation must first be performed before a write operation. Unfortunately, the erase operation and the write operation are applied to different sized blocks of data (i.e., different unit operation sizes) within the flash memory. Namely, the erase unit is larger than the write (or program) unit. This inherent unit operation size mismatch has traditionally impeded the use of flash memory in main memories, and has also hindered the development and use of a general hard disk file system when flash memory is used within an auxiliary storage device.

One response to the unit operation (erase verses write/program) size mismatch is the so-called flash translation layer (FTL). In practical effect, the use of a FTL between the physical memory cells of flash memory and a corresponding file system will hide the operation size mismatch.

To this point in time, conventional solid state drive (SSD) controllers have characteristics, such as a multi-channel parallel array structure, that preclude their use with so-called host command queues, such as a native command queue (NCQ). This conventional disability largely precludes the higher performance being demanded for contemporary semiconductor memory devices and related memory systems. In other words, since conventional SSD controllers include only a single FTL to handle all of the data channels provided by a multi-channel parallel array structure, when a plurality of instructions are processed simultaneously in an NCQ environment, the instruction processing functionality of the FTL restricts overall performance of the constituent semiconductor memory devices, and limits the data access capabilities of the incorporating memory system.

SUMMARY

The present inventive concept provides a solid state drive (SSD) controller for improving a data processing speed by processing a plurality of instructions, such as a native command queue (NCQ), in parallel, a data storage device and a data storage system including the controller, and a data processing method.

According to an aspect of the present inventive concept, there is provided a controller for controlling a non-volatile memory device including a plurality of channels, the controller including a plurality of address translation central processing units (CPUs) each for performing logical-physical address translation with respect to at least one of the plurality of channels in response to an instruction output from a host; and a plurality of flash memory controllers each for controlling an access operation on at least one of the plurality of channels in response to a control signal output from at least one of the plurality of address translation CPUs.

The plurality of address translation CPUs may perform the logical-physical address translations with respect to channels that are not overlapped with one another, in parallel.

Each of the plurality of address translation CPUs may include an address translation unit for translating a logical address output from the host into a physical address; a wear leveling unit for performing a wear leveling operation on the non-volatile memory device and transmitting information about a result of the wear leveling operation to the address translation unit; and a bad-block management unit for managing bad blocks included in the non-volatile memory device and transmitting bad block information to the address translation unit.

The bad-block management unit may include a bad-block mapping register in which a bad-block mapping table is stored; a bad-block mapping loader for loading bad block information stored in the non-volatile memory device to the bad-block mapping register; and a bad-block state controller for generating a remapping mark flag on the basis of the number of remapping marks stored in the bad-block mapping register and transmitting the remapping mark flag to the address translation unit.

The bad-block state controller may output the remapping mark flag set to be logic high, if the number of remapping marks stored in the bad-block mapping register is 1 or more. The address translation unit may select a free block address as a physical address in response to the remapping mark flag set to be logic high.

The wear leveling unit may sequentially scan erase count information of blocks included in the non-volatile memory device and transmit the erase count information to the address translation unit. The address translation unit may select, as the physical address, an address of a block having a small erase count from among the blocks included in the non-volatile memory device, by referring to the scanned erase count information of the blocks included in the non-volatile memory device.

The controller may further include a host CPU for processing the instructions output from the host. The host CPU may determine priorities of the instructions and distribute the instructions to the plurality of address translation CPUs according to the determined priorities. The controller may further include an inter-processor communication (IPC) module for controlling a communication between the host CPU and the plurality of address translation CPUs.

Each of the plurality of flash memory controllers may include an error correction coder for performing error correction coding on at least a part of the non-volatile memory device.

The controller may further include a buffer including a mapping table in which logical addresses and physical addresses are recorded; and a bus matrix for providing a path via which the plurality of address translation CPUs access the buffer. Each of the plurality of address translation CPUs may access the buffer via the bus matrix according to a time-sharing method. The controller may further include an instruction memory block in which the instructions allowing the plurality of address translation CPUs to perform the logical-physical address translations are stored. The instruction memory block may be shared between the plurality of address translation CPUs.

According to another aspect of the present inventive concept, there is provided a data storage device including a non-volatile memory device including a plurality of channels; a controller including a flash translation layer (FTL), for performing a logical-physical address translation and controlling the non-volatile memory device; and a random access memory for storing an address mapping table in which address mapping information used to perform the logical-physical address translation is recorded. The controller may include a plurality of address translation CPUs each for performing logical-physical address translation with respect to at least one of the plurality of channels in response to an instruction output from a host; and a plurality of flash memory controllers each for controlling an access operation on at least one of the plurality of channels in response to a control signal output from at least one of the plurality of address translation CPUs.

In the address mapping table, mapping information about the channels on which the plurality of address translation CPUs perform the logical-physical address translations may be stored independently from one another.

According to another aspect of the present inventive concept, there is provided a data storage system including a host; and a data storage device for performing a data storage operation in response to instructions output from the host. The data storage device may include a non-volatile memory device including a plurality of channels; a controller including a plurality of address translation CPUs each for performing logical-physical address translation with respect to at least one of the plurality of channels; and a random access memory for storing an address mapping table in which address mapping information used to perform the logical-physical address translation is recorded.

According to another aspect of the present inventive concept, there is provided a data processing method including receiving instructions from a host, wherein the receiving is performed in a host CPU; determining priorities of the instructions and distributing the instructions to the plurality of address translation CPUs according to the determined priorities, wherein the determining and distributing is performed in the host CPU; and performing logical-physical address translations in response to the distributed instructions, wherein the performing of the logical-physical address translations are performed in the plurality of address translation CPUs.

The data processing method may further include loading an address mapping table, wherein the loading is performed in each of the plurality of address translation CPUs; receiving wear leveling information or bad block information of a non-volatile memory device, wherein the receiving is performed in each of the plurality of address translation CPUs; and changing the loaded address mapping table on the basis of the received wear leveling information or the received bad block information, wherein the changing is performed in each of the plurality of address translation CPUs.

The loading of the address mapping table performed in each of the plurality of address translation CPUs may include accessing the address mapping table via a bus matrix according to a time sharing method, wherein the accessing is performed in each of the plurality of address translation CPUs.

BRIEF DESCRIPTION OF THE DRAWINGS

Embodiments of the inventive concept will be more clearly understood from the following detailed description taken in conjunction with the accompanying drawings in which:

FIGS. 3A and 3B are tables illustrating an address translation operation according to an embodiment of the inventive concept;

FIG. 7 is a conceptual diagram comparing the operating speed of a conventional solid state disk (SSD) controller with the operating speed of a SSD controller according to an embodiment of the inventive concept.

DETAILED DESCRIPTION OF THE EMBODIMENTS

Figure 1:
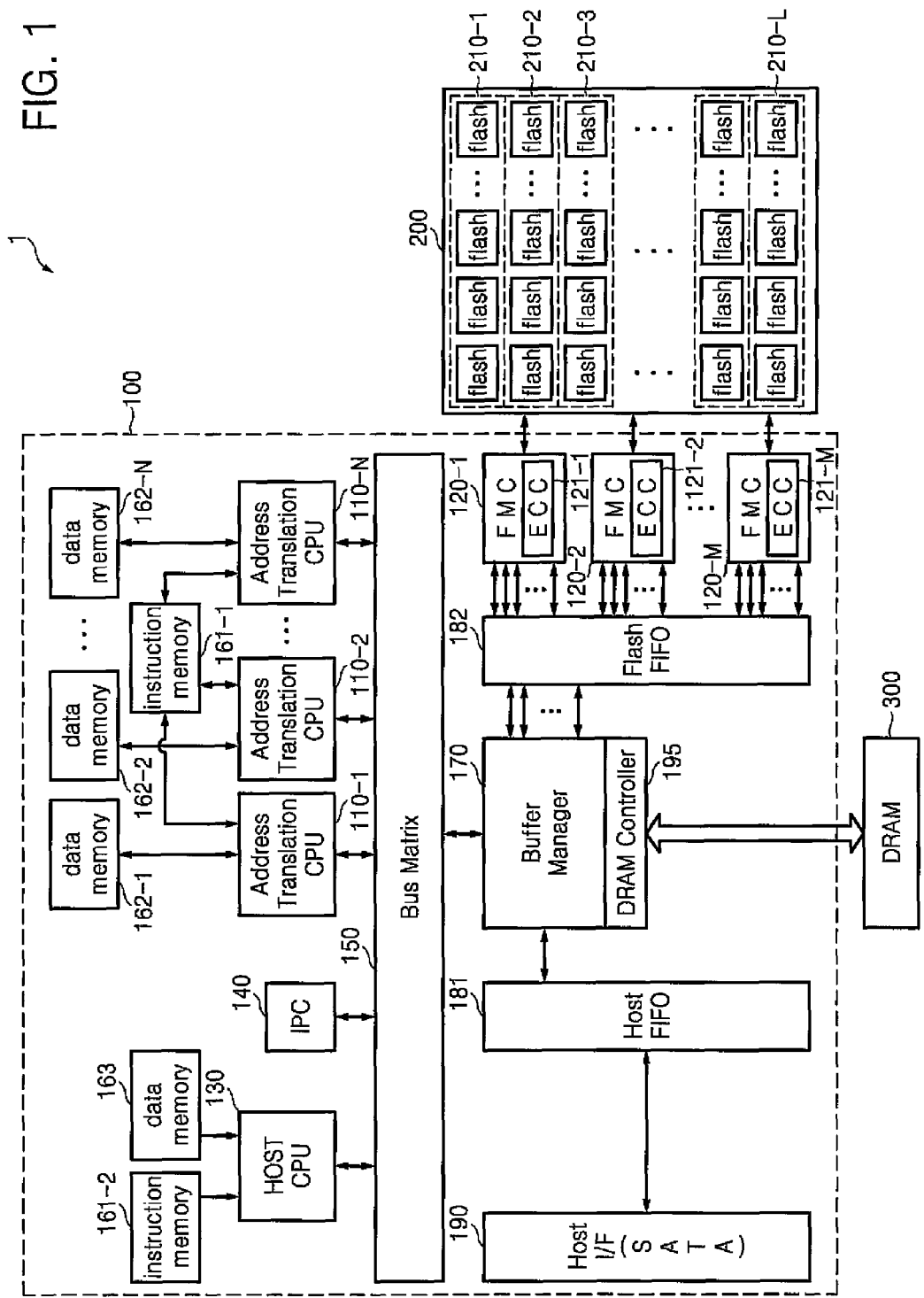
FIG. 1 is a schematic block diagram of a data storage system according to an embodiment of the inventive concept.

Figure (FIG. 1 is a schematic block diagram of a data storage system 1 according to an embodiment of the inventive concept. The data storage system 1 generally comprises a solid state disk (SSD) controller 100, a non-volatile memory device 200, and a random access memory 300. Although a SSD controller is used in the example of the data storage system of FIG. 1, the present inventive concept is not limited thereto.

The non-volatile memory device 200 comprises at least one non-volatile memory cell. The non-volatile memory cell may include EEPROM, flash memory, magnetic RAM (MRAM), spin-transfer torque MRAM, conductive bridging RAM (CBRAM), ferroelectric RAM (FeRAM), PRAM (phase change RAM), resistive RAM (RRAM or ReRAM), nanotube RRAM, polymer RAM (PoRAM), nano floating gate memory (NFGM), holographic memory, a molecular electronic memory device, or insulator resistance change memory. Each non-volatile memory cell may be configured to store a single bit of data or a plurality of bits.

The SSD controller 100 may include a plurality of address translation central processing units (CPUs), namely, first, second, . . . , and N-th address translation CPUs 110-1, 110-2, . . . , and 110-N, (or collectively called as an address translation CPU 110), and a plurality of flash memory controllers, namely, first, second, . . . , and M-th flash memory controllers 120-1, 120-2, . . . , and 120-M, (or collectively called as a flash memory controller 120).

The address translation CPU 110 may perform logical-to-physical address translations with respect to at least one channel (or memory group) from among a plurality of channels (or plurality of memory groups), namely, first, second, . . . , and L-th channels (or memory groups) 210-1, 210-2, . . . , and 210-L, (or collectively or individually referred to as channel 210) included in the non-volatile memory device 200, in response to an instruction provided from a host (not shown).

An address mapping table in which information related to the logical-to-physical address translations has been stored may be stored in the random access memory 300, such as a DRAM. Although the random access memory 300 is located outside the SSD controller 100 in the illustrated embodiment of FIG. 1, it may alternately be included within the SSD controller 100 in other embodiments of the inventive concept. For example, the random access memory 300 and SSD controller 100 may be implemented in a multi chip package (MCP). To control the random access memory 300, the SSD controller 100 may further include a DRAM controller 195.

As illustrated in FIG. 1, the address translation CPUs 110-1, 110-2, . . . , and 110-N may be driven independently and may perform parallel processing simultaneously, so that a bottle-neck phenomenon caused due to the inclusion of a single flash translation layer (FTL) may be effectively resolved. As in the embodiment illustrated in FIG. 1, the address translation CPU 110, which is dedicated, may be implemented in firmware, for example. Thus, a data storage circuit or a system including the data storage circuit may be easily corrected or changed.

Each of the address translation CPUs 110-1, 110-2, . . . , and 110-N may perform an address translation operation with respect to at least a part of the non-volatile memory device 200 divided in units designated as channels or memory groups. In one more particular embodiment of the inventive concept, each channel comprises a number of flash memory chips capable of sharing (i.e., receiving data from and/or communicating data to) a single input/output (I/O) pin. Thus, each of the channels (or memory groups) 210-1, 210-2, . . . , and 210-L included in the non-volatile memory device 200 of FIG. 1 may include at least one flash memory chip.

In this case, respective channel ranges controlled by the address translation CPUs 110-1, 110-2, . . . , and 110-N will not overlap one another. For example, when a first channel 210-1 included in the non-volatile memory device 200 is controlled by the first address translation CPU 110-1, the first channel 210-1 may be dedicatedly controlled by only the first address translation CPU 110-1, and not controlled by the other address translation CPUs 110-2 through 110-N. This structure may be equally applied to each of the flash memory controllers 120-1, 120-2, . . . , and 120-M. Thus, channel ranges on which the flash memory controllers 120-1, 120-2, . . . , and 120-M perform operations, respectively, may not overlap with one another.

In certain embodiments of the inventive concept, the channel ranges controlled by the address translation CPUs 110-1, 110-2, . . . , and 110-N may correspond to the channel ranges on which the flash memory controllers 120-1, 120-2, . . . , and 120-M perform operations, respectively, in a one-to-one correspondence. For example, if the first address translation CPU 110-1 controls address translation operations with respect to the first and second channels 210-1 and 210-2 of the non-volatile memory device 200, the first flash memory controller 120-1 corresponding to the first address translation CPU 110-1 may perform flash operations with respect to the first and second channels 210-1 and 210-2.

The flash memory controller 120 may control an operation with respect to the non-volatile memory device 200 in response to a control signal (not shown) output from the address translation CPU 110. Examples of a data access operation that may be controlled by the flash memory controller 120 include a write/program operation, a read operation, an erase operation, etc.

The flash memory controllers 120-1, 120-2, . . . , and 120-M may respectively include error correction coders 121-1, 121-2, . . . , and 121-M (or collectively called as an error correction coder 121), each configured to perform error correction coding on data retrieved form at least a portion of the non-volatile memory device 200. For example, the error correction coders 121-1, 121-2, . . . , and 121-M may perform error correction coding (ECC) on channels on which the corresponding flash memory controllers 120-1, 120-2, . . . , and 120-M perform flash operations.

If a bit error is detected in data stored in a flash memory, the error correction coding may include a process of adding additional data (e.g., parity check data) that may subsequently be used to correct the bit error. This additional data (or "ECC data") may be calculated as code that represents a bit sequence of the original data (or "payload data"), and may then be added to the original data. Using this conventionally understood approach or similar approaches, the error correction coder 121 may determine whether a bit error has been generated in the stored data retrieved (read) from the non-volatile memory device 200 by (e.g.) comparing a code value generated during the read operation with a code value generated during a preceding write operation.

The address translation CPUs 110-1, 110-2, . . . , and 110-N may have a multi-CPU structure, and thus the SSD controller 100 according to the embodiment illustrated in FIG. 1 may further include a host CPU 130 for distributing instructions received from a host so that the address translation CPUs 110-1, 110-2, . . . , and 110-N having the multi-CPU structure may perform parallel processing.

The host CPU 130 is used to process instructions and/or data provided by the host, and thus may manage the queue of incoming instructions and data using the DRAM buffer as a cache. When instructions are transmitted to the address translation CPUs 110-1, 110-2, . . . , and 110-N, the address translation CPUs 110-1, 110-2, . . . , and 110-N may process the received commands.

In order to facilitate communication between the host CPU 130 and the address translation CPUs 110-1, 110-2, . . . , and 110-N, the SSD controller 100 according to the embodiment illustrated in FIG. 1 further comprises an inter-processor communication (IPC) module 140.

The IPC module 140 is a collection of programming interfaces that allow a programmer to produce and handle an individual program which is to be performed simultaneously in a single operating system (OS), and intends a single program to process many users' demands simultaneously. Such an IPC method may include certain types of conventionally understood pipelining techniques, such as (e.g.) message queueing, semaphore, shared memory, socket, and the like.

When the host CPU 130 transmits a predetermined parameter and an instruction to the IPC module 140, the IPC module 140 transmits an interrupt signal to a corresponding address translation CPU 110, and in response to the interrupt signal, the address translation CPU 110 may receive the predetermined parameter and the instruction and process the instruction according to an interrupt processing routine. In certain embodiments of the inventive concept, the IPC module 140 may be used only in an identical system (for example, local system) or used in different systems (for example, remote system).

As illustrated in FIG. 1, the controller such as the SSD controller 100 may further include instruction memories 161-1 and 161-2 (or collectively called as an instruction memory 161). The instruction memory 161 may include the instruction memory 161-1 used by the address translation CPUs 110-1, 110-2, . . . , and 110-N, and the instruction memory 161-2 used by the host CPU 130.

An instruction (or command) stored in the instruction memory 161-1 may include information about a program necessary for the operations of the address translation CPUs 110-1, 110-2, . . . , and 110-N. Each of the address translation CPUs 110-1, 110-2, . . . , and 110-N may fetch an instruction from the instruction memory 161-1. If the IDs of the address translation CPUs 110-1, 110-2, . . . , and 110-N can be distinguished from one another, since the functions of the address translation CPUs 110-1, 110-2, . . . , and 110-N are the same, the address translation CPUs 110-1, 110-2, . . . , and 110-N may share the instruction memory 161-1. This description may be equally applied to the instruction memory 161-2 for the host CPU 130.

As illustrated in FIG. 1, the SSD controller 100 may further include a plurality of data memories 162-1, 162-2, . . . 162-N, and 163. The plurality of the data memories 162-1, 162-2, . . . , and 162-N (or collectively called as a data memory 162) corresponding to the address translation CPUs 110-1, 110-2, . . . , and 110-N, respectively, may store a global variable and the like which are necessary for the operation of the address translation CPU 110, and the plurality of the data memories 162-1, 162-2, . . . 162-N may be installed independently from the address translation CPUs 110-1, 110-2, . . . , and 110-N, respectively. This description will be equally applied to the data memory 163 for the host CPU 130.

As illustrated in FIG. 1, the instruction memory 161 and the data memories 162 and 163 may access the address translation CPU 110 and the host CPU 130 via a local bus not via a bus matrix 150.

The SSD controller 100 further comprises the bus matrix 150. The bus matrix 150 enables the address translation CPU 110 which serves as a master for the entire system bus to perform bus processing in parallel.

The address translation CPU 110 may access the random access memory 300 in which information about address mapping is stored, via the bus matrix 150. In this case, a time sharing method may be used.

The SSD controller 100 further comprises a buffer manager 170. The buffer manager 170 manages write/programming operations for data provided from the host or read operations for data provided from the non-volatile memory device 200 to/from a buffer, and thus performs, for example, buffer arbitration, data scattering, data gathering, or host data flow control. These data flow control and buffering techniques are conventionally understood.

The SSD controller 100 of FIG. 1 also further comprises a host interface (I/F) 190. In certain embodiments of the inventive concept, the host I/F 190 may be an advanced technology architecture (ATA) interface, a serial advanced technology architecture (SATA) interface, or a parallel advanced technology architecture (PATA) interface, and is a system capable of supporting a command queue such as a native command queue (NCQ).

In a general server system, an Input/Output Per Second (IOPS) may be important as the unit of performance measurement while supporting the command queue. Since SSDs has no procedure of searching a mechanical part such as a platter, the SSDs have high IOPS compared with hard disks, but still may acquire much higher IOPS by including the host I/F 190 capable of supporting the command queue.

The SSD controller 100 further comprises a host FIFO 181 and a flash FIFO 182. The host FIFO 181 may act as a buffer when a clock signal for processing data in a host and a clock signal for storing data in a buffer are different. The flash FIFO 182 may act as a buffer when a clock signal for processing data in a flash bus and the clock signal for storing data in the buffer are different.

As described above, the non-volatile memory device 200 may include the channels 210-1, 210-2, . . . , and 210-L, each of which may include at least one flash memory chip capable of sharing a single I/O pin. For example, in some embodiments, each channel from among the channels 210-1, 210-2, . . . , and 210-L of the non-volatile memory device 200 may include 8, 12, or 16 flash memory chips.

In other words, the non-volatile memory device 200 has a multi-channel parallel array structure, and the address translation CPU 110 or the flash memory controllers 120 operate in parallel simultaneously with respect to the channels 210-1, 210-2, . . . , and 210-L. Thus, a bottle-neck phenomenon caused due to inclusion of only a single address translation engine in the conventional art may be efficiently resolved, and thus the IOPS may be significantly increased.

Figure 2:
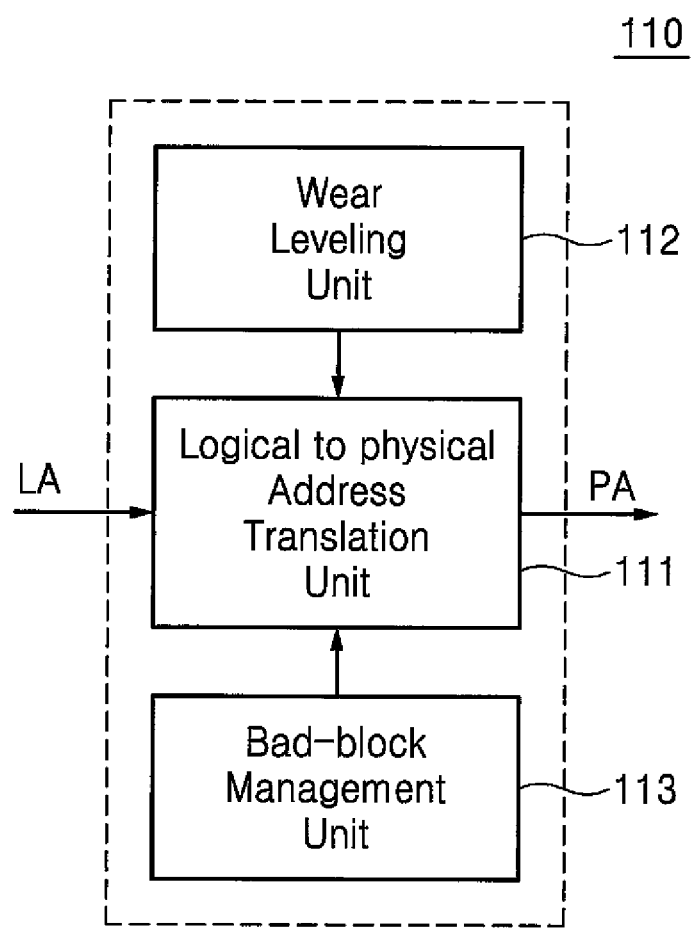
FIG. 2 is a schematic block diagram of an address translation central processing unit (CPU) according to an embodiment of the inventive concept.

FIG. 2 is a schematic block diagram further illustrating the address translation CPU 110 according to an embodiment of the inventive concept. Referring to FIGS. 1 and 2, the address translation CPU 110 may comprise a logical to physical address translation unit 111, a wear leveling unit 112, and a bad-block management unit 113.

The logical to physical address translation unit 111 essentially translates a logical address (LA) received from the host into a corresponding physical address (PA). The logical to physical address translation unit 111 may perform page-level address mapping or block-level address mapping according to levels of address mapping.

In addition, a log block scheme has been recently proposed and used, and the log block scheme may store data in the form of log, similar to a log structure file system. The log block scheme is a combination of a page-level address mapping scheme and a block-level address mapping scheme. When I/O data is requested in relatively large units, the log block scheme may process the I/O data in units of blocks. When I/O data is requested in relatively small units, the log block scheme may process the I/O data in units of pages.

The logical to physical address translation unit 111 is configured to perform the address translation operation with reference to an address mapping table stored in the random access memory 300 of FIG. 1. As described above, the address mapping table may be stored in a buffer (not shown) of the SSD controller 100. In this case, the logical to physical address translation unit 111 may access the buffer to acquire mapping information.

In the random access memory 300, a plurality of address mapping tables corresponding respect8ively to the address translation CPUs 110-1, 110-2, . . . , and 110-N may be independently included. An exemplary address translation operation performed by the logical to physical address translation unit 111 will be described hereafter with reference to FIGS. 3A, 3B, and 4.

The wear leveling unit 112 is configured to perform a wear leveling operation with respect to the non-volatile memory device 200 and transmit wear leveling information derived from the wear leveling operation to the logical to physical address translation unit 111. In the illustrated embodiment, the wear leveling operation denotes management of an address mapping table such that a write/program operation is performed for each memory block a relatively equal number of times to preclude undue wear on any particular block.

In general, an erase operation performed in flash memory requires a longer time than a write/program operation, and is performed in relation to a larger unit operation block. This condition inevitably results in certain write/program blocks, for example, being unnecessarily erased. That is, since the unit operation size for the erase operation performed in a flash memory is not identical to the unit operation size of a write/program operation, the overall performance capabilities of the write/program operation is much less than the read operation. Taking a contemporary example, if about 100,000 erase operations are performed on a single block of flash memory, the block becomes unusable. Hence, a competent flash memory controller must perform some form of wear leveling operation in order to prevent erase operations from unevenly wearing one or more specific blocks.

For example, when a write command associated with predetermined write data is received from an external source, the wear leveling unit 112 may scan certain erase count information for all possible data blocks, either sequentially or according to a prescribed scan order. When a data block where data is to be stored has reached a prescribed erase count, the physical address PA of the data block may be changed such that the data is written to a block (e.g., a "free-block") for which the erase count is relatively low. An exemplary operation for the wear leveling unit 112 will be described hereafter in some additional detail with reference to FIGS. 5A, 5B and 5C.

The bad-block management unit 113 is configured to manage information about a bad block included in the non-volatile memory device 200 and transmit the information regarding the bad block to the logical to physical address translation unit 111. An error may be generated in a flash memory cell during manufacture or use, and thus the reliability of data is lowered when the data is written or programmed to a "bad cell" producing the data error. Therefore, certain bad block(s) having a predetermined number of bad cell(s), and therefore yielding a number of data error(s) must be suitably managed.

Since the bad-block management unit 113 is configured to identify information regarding a bad block included in the non-volatile memory device 200, and transmit the bad block information to the logical to physical address translation unit 111. In this manner, address mapping onto a bad block may be prevented. The operation of the bad-block management unit 113 will be described hereafter in some additional detail with reference to FIGS. 6A, 6B and 6C.

Figure 3B:
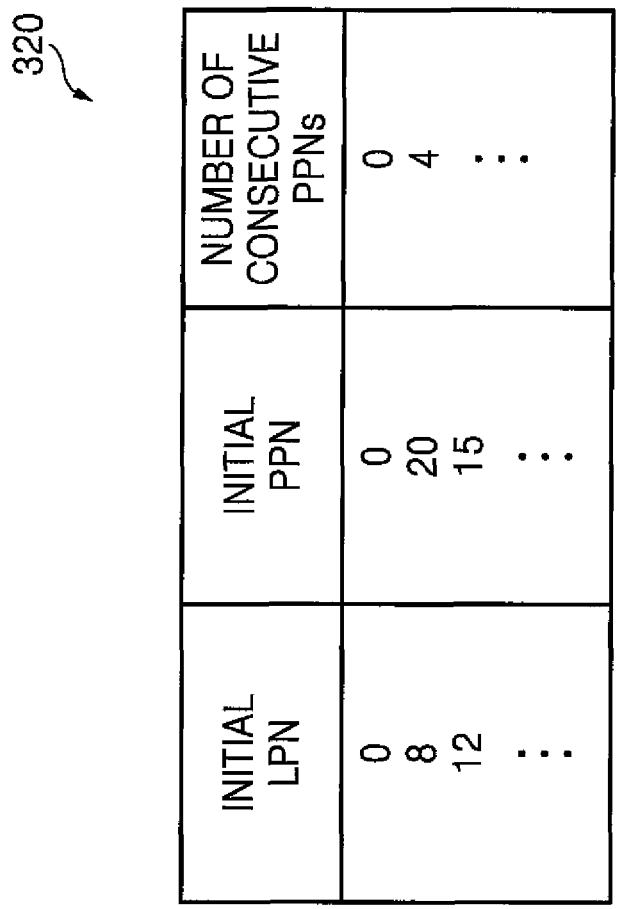

FIGS. 3A and 3B are tables further illustrating an address translation operation according to an embodiment of the inventive concept. Referring to FIGS. 1 through 3B, logical-physical address translation that can be performed in the SSD controller 100 may be performed using various methods. FIGS. 3A and 3B illustrate execution of logical-physical address translation based on a RUN-level address mapping table.

The non-volatile memory device 200 is assumed to include a plurality of memory blocks. Each of the memory blocks are further assumed to include a plurality of pages (or sectors). A reference (or identifying) number is allocated to a page and may be referred to as a logical page number (LPN), while a physical number allocated to the page may be referred to as a physical page number (PPN).

The LPN and the PPN are related with (or matched to) each other in a one-to-one correspondence according to the address mapping table stored in the random access memory 300. For example, data of a first LPN LPN0 may be stored in a first PPN PPN0, and data of a second LPN LPN1 may be stored in a second PPN PPN1.

Seeing the data construction of an address mapping table 310 illustrated in FIG. 3A, LPNs and PPNs are somewhat consecutively arranged. For example, the data of first through eighth LPNs LPN0 through LPN7 may be consecutively stored in first through eighth PPNs PPN0 through PPN7, and the data of ninth through twelfth LPNs LPN8 through LPN11 may be consecutively stored in twenty-first through twenty-fourth PPNs PPN20 through PPN23.

A collection of these adjacent pages may be referred to as a RUN. FIG. 3B illustrates an address translation operation based on an address mapping table 320 formed based on the unit of RUN. The address mapping table 320 formed based on the unit of RUN is referred to as a RUN-level address mapping table 320.

FIG. 3B illustrates the RUN-level address mapping table 320. The RUN-level address mapping table 320 is obtained by reconstructing the address mapping table 310 of FIG. 3A in units of RUN, and the size of the RUN-level address mapping table 320 is visually significantly reduced compared with the address mapping table 310.

Referring to FIG. 3B, the RUN-level address mapping table 320 may be composed of an initial LPN item, an initial PPN item, and a consecutive PPN (the number of consecutive PPNs) item. The initial LPN item may include initial LPNs for RUNs, and the initial PPN may include initial PPNs for RUNs. The consecutive PPN item may include the number of pages included in each RUN. In other words, a flash memory-based storage device may efficiently manage mapping information although having a small capacity by using the address mapping table 320 of FIG. 3B.

Figure 4:
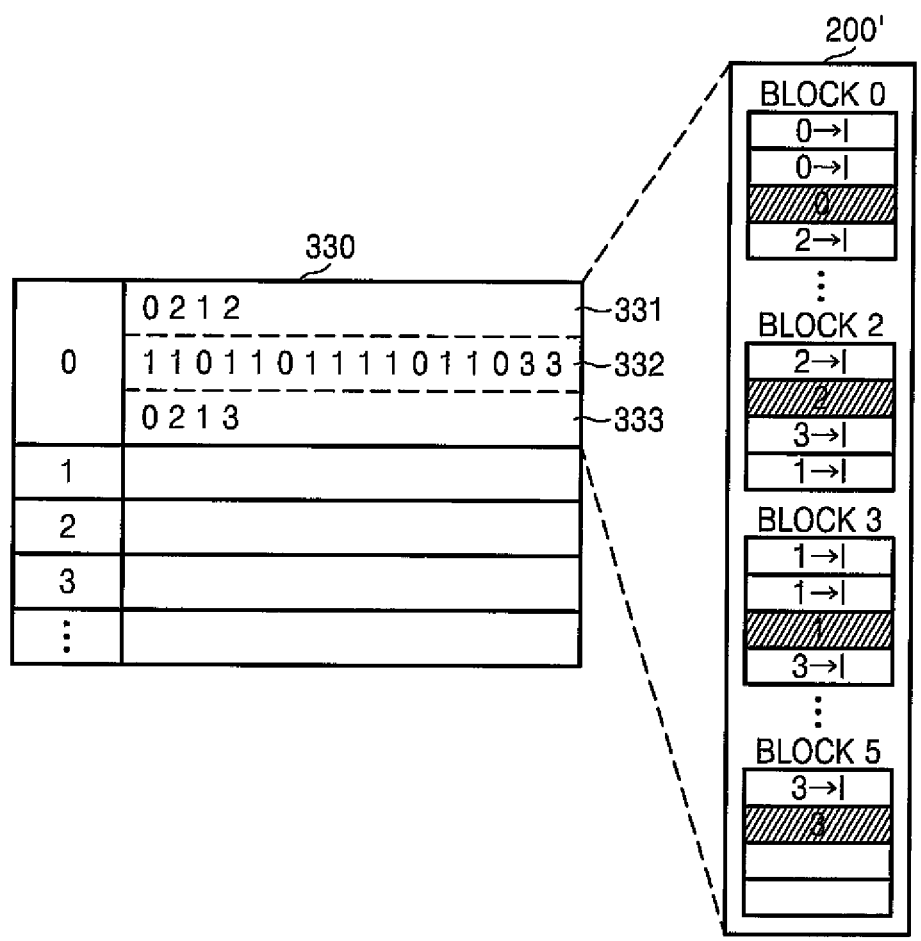
FIG. 4 conceptually illustrates an address translation operation according to another embodiment of the inventive concept.

FIG. 4 is another table illustrating an address translation operation according to another embodiment of the inventive concept. FIG. 4 illustrates execution of a block-level address mapping operation.

An address mapping table 330 illustrated in FIG. 4 has a different structure from the tables shown in FIGS. 3A and 3B and includes a block mapping code unit. The block mapping code unit includes a PPN block 331, a page state block 332, and an LPN block 333, and provide location information regarding actual physical memory regions. The page state block 332 stores four types of states (e.g., –0 representing an LPN, 1 representing invalid, 2 representing sequence, 3 representing a free page).

When LPNs are input from the host, the LPNs are sequentially input to empty pages of a non-volatile memory device 200'. At this time, if an LPN already input to an empty page is requested to be corrected, the page may turn into an invalid state, and the next empty page may be allocated and updated.

For example, it is assumed that blocks 0, 2, 3, and 5 include empty pages, that each of the blocks 0, 2, 3, and 5 is made up of 4 pages, and that LPNs "0,0,0,2,2,2,3,1,1,1,1,3,3,3" for a write request are sequentially input. First, a first LPN '0' is input to a first page of the block 0 BLOCK 0 having empty pages within the physical memory region 200'. Then, if a request for correction of '0' of a second LPN being the same as the first LPN is input, the first page of the block 0 BLOCK 0 is processed to store invalid data, that is, is marked with a character I. The second LPN '0' is input to a second page of the block 0 BLOCK 0, which is empty, in the physical memory region 200'.

Similar to the first page of the block 0 BLOCK 0, when '0' of a third LPN being the same as the second LPN is input, the second page of the block 0 BLOCK 0 is processed to store invalid data. The third LPN '0' may be input to a third page of the block 0 BLOCK 0, which is empty, in the physical memory region 200'.

When this method is equally applied to all of the input LPNs, the physical memory region 200' may be defined as illustrated in FIG. 4. In certain approaches consistent with the illustrated embodiment, valid data is recorded in hatched pages.

This information may be recorded in the block mapping code unit. In some additional detail, the PPN block 331 stores information about blocks of the physical memory region 200' that store valid data. Thus, hatched blocks denote blocks 0, 2, 3, and 5 in which valid data is recorded. At this time, a value corresponding to a difference between two blocks may be recorded to reduce the number of bits used to store information. Thus, '0212' may be recorded in the PPN block 331.

The page state block 332 may include position information about extracted valid pages. At this time, valid pages in which LPNs are registered may be marked with '0', pages processed to store invalid data (namely, pages marked with I) may be marked with '1', and empty pages may be marked with '3'. Thus, '1101 1011 1101 1033' may be recorded in the page state block 332.

The LPN block 333 may include information about the logical sector numbers of the valid pages. Thus, the values of the valid data in the hatched pages may be recorded, and thus '0213' may be recorded in the LPN block 333.

The use of the address mapping table 330, as described above, may lead to a significant reduction in the amount of memory consumed by the mapping table. Thus, while all mapping tables cannot be conventionally loaded to main memory because of the large amount of memory consumed, the address mapping table 330 and similar mapping tables according to embodiments of the inventive concept and requiring only a relatively small amount of memory capacity may be loaded.

Figure 5A:
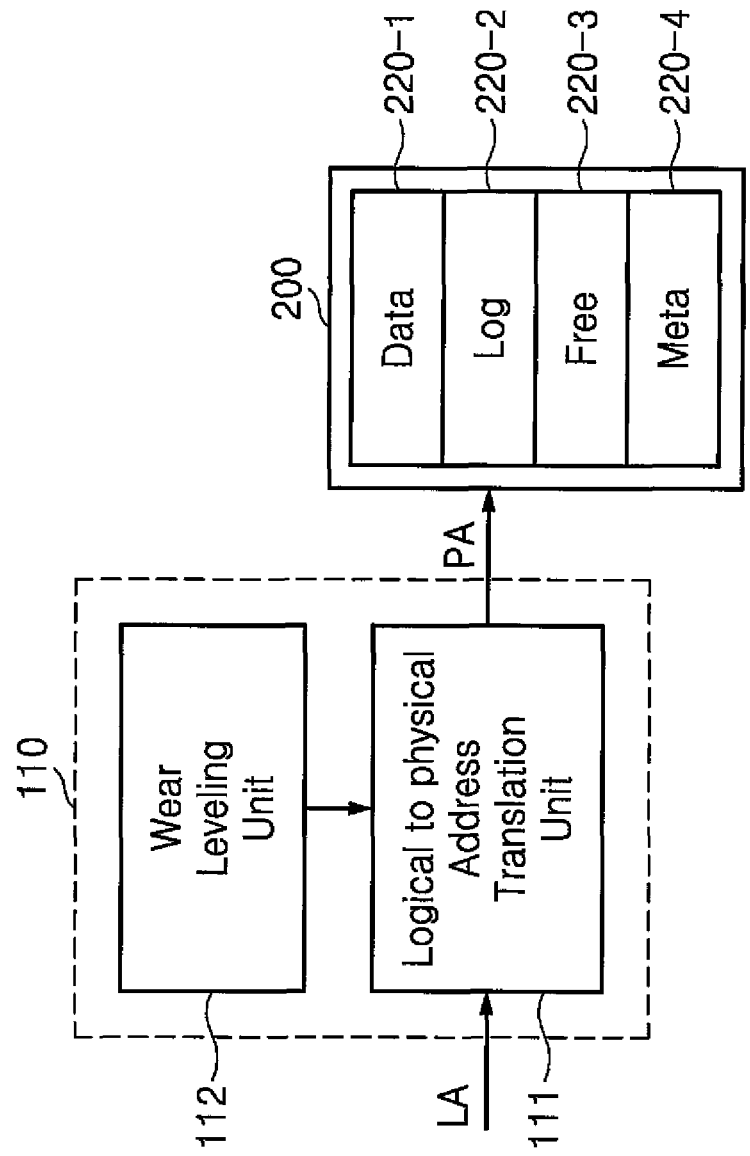
FIGS. 5A, 5B and 5C are schematic diagrams illustrating a wear leveling operation according to an embodiment of the inventive concept.
Figure 5B:
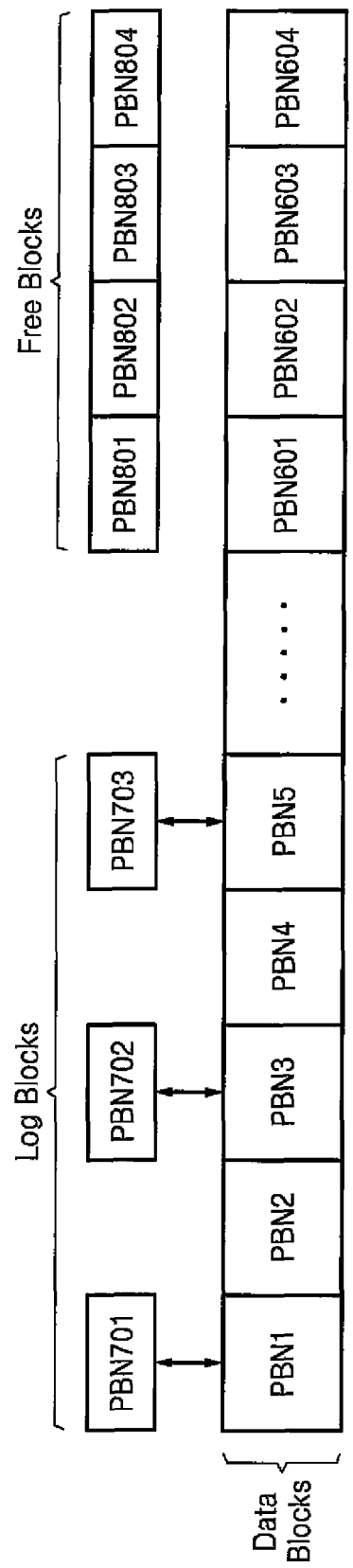
Figure 5C:
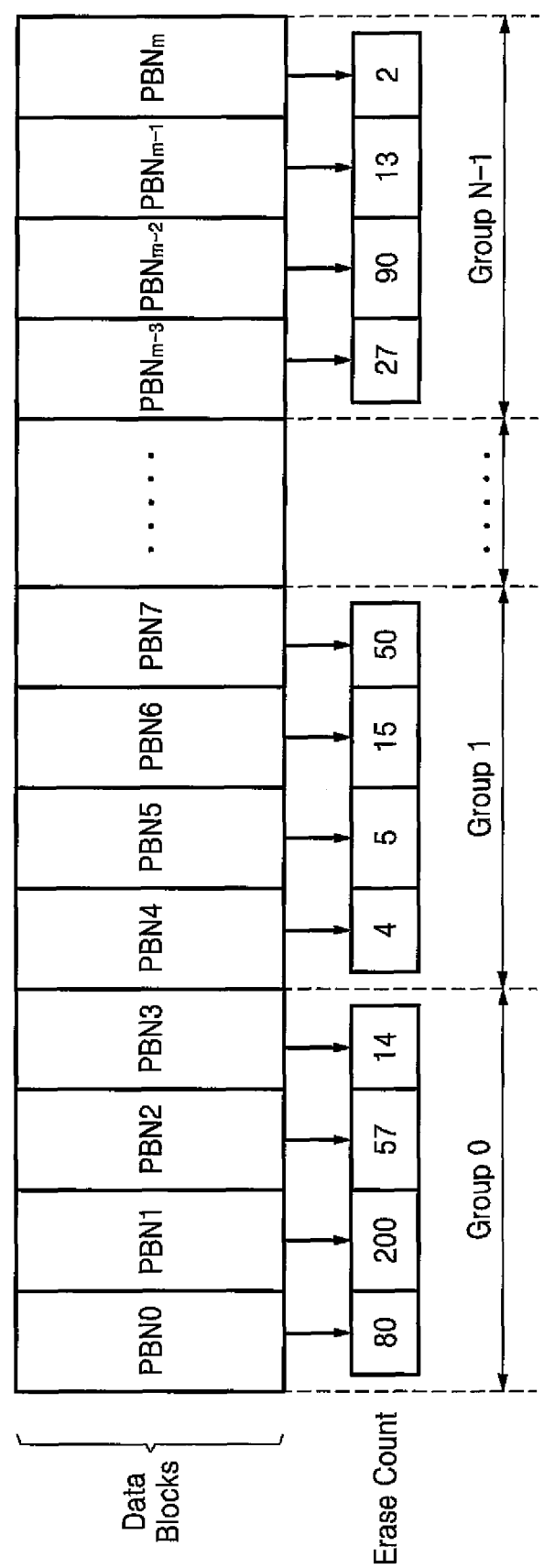

FIGS. 5A, 5B and 5C are schematic diagrams illustrating a wear leveling operation according to an embodiment of the inventive concept. Referring to FIGS. 1 through 5A, the address translation CPU 110 includes the logical to physical address translation unit 111 and wear leveling unit 112. The address translation CPU 110 receives a logical address LA and translates the logical address LA into a corresponding physical address PA on the basis of a mapping table. As described above, the mapping table may be stored in the random access memory 300 or it may be stored in a meta block 220-4 of the non-volatile memory 200 and loaded to the wear leveling unit 112 during a write operation.

The wear leveling unit 112 performs a wear leveling operation and transmits the results to the logical to physical address translation unit 111. For example, if a wear leveling condition is satisfied, the wear leveling unit 112 may control a data block having the lowest erase count value to be exchanged with a free block having the highest erase count value. The erase count value will increase whenever an erase operation is performed on each memory block. In one embodiment, the erase count value will be stored in the meta block Meta 220-4 of the non-volatile memory 200.

FIG. 5B is a conceptual diagram further illustrating a mapping method executed in relation to the block diagram of FIG. 5A. Referring to FIGS. 5A and 5B, the non-volatile memory 200 includes a data region 220-1 including data blocks, a log region 220-2 including log blocks, and a free region 220-3 including free blocks.

The data region 220-1 includes first through $604^{th}$ data blocks PBN1 through PBN604 having PBNs of 1 through 604. The log region 220-2 includes first through third log blocks PBN701 through PBN703 having PBNs of 701 through 703. The free region 220-3 include first through fourth free blocks PBN801 through PBN804 having PBNs of 801 through 804. The first log block PBN701 is allocated to the first data block PBN1, the second log block PBN702 is allocated to the third data block PBN3, and the third log block PBN703 is allocated to the fifth data block PBN 5.

When a write request is received from the host, the wear leveling unit 112 determines whether there exists a log block allocated to a corresponding data block. If there exists a log block allocated to the corresponding data block, the log block may be used to perform a write operation. On the other hand, if no log blocks are allocated to the corresponding data block, the corresponding data block may assign a new log block from a free block. The new log block may undergo an erase operation and then undergo a write operation.

FIG. 5C is a conceptual diagram further illustrating physical blocks PBN0 through PBNm of the data region 220-1 of FIG. 5B according to an embodiment of the inventive concept. Referring to FIGS. 1 through 5C, the physical blocks PBN0 through PBNm may be virtually divided into N groups Group0 through GroupN−1. Each of the N groups includes 4 blocks in the illustrated example, but the choice of 4 blocks is just one example used here for illustrative purposes.

Assuming that the wear leveling condition is satisfied, the wear leveling unit 112 may scan erase count information in defined "block units" within the non-volatile memory device 200. Alternatively, the wear leveling unit 112 may scan erase count information in "group units", as illustrated in FIG. 5C. When erase count information is scanned in group units as illustrated in FIG. 5C, the erase count information may be stored in the meta block 220-4 of the non-volatile memory device 200 in group units. During a write operation, erase count information for a selected memory block group and group count information may be loaded to the wear leveling unit 112.

Figure 6A:
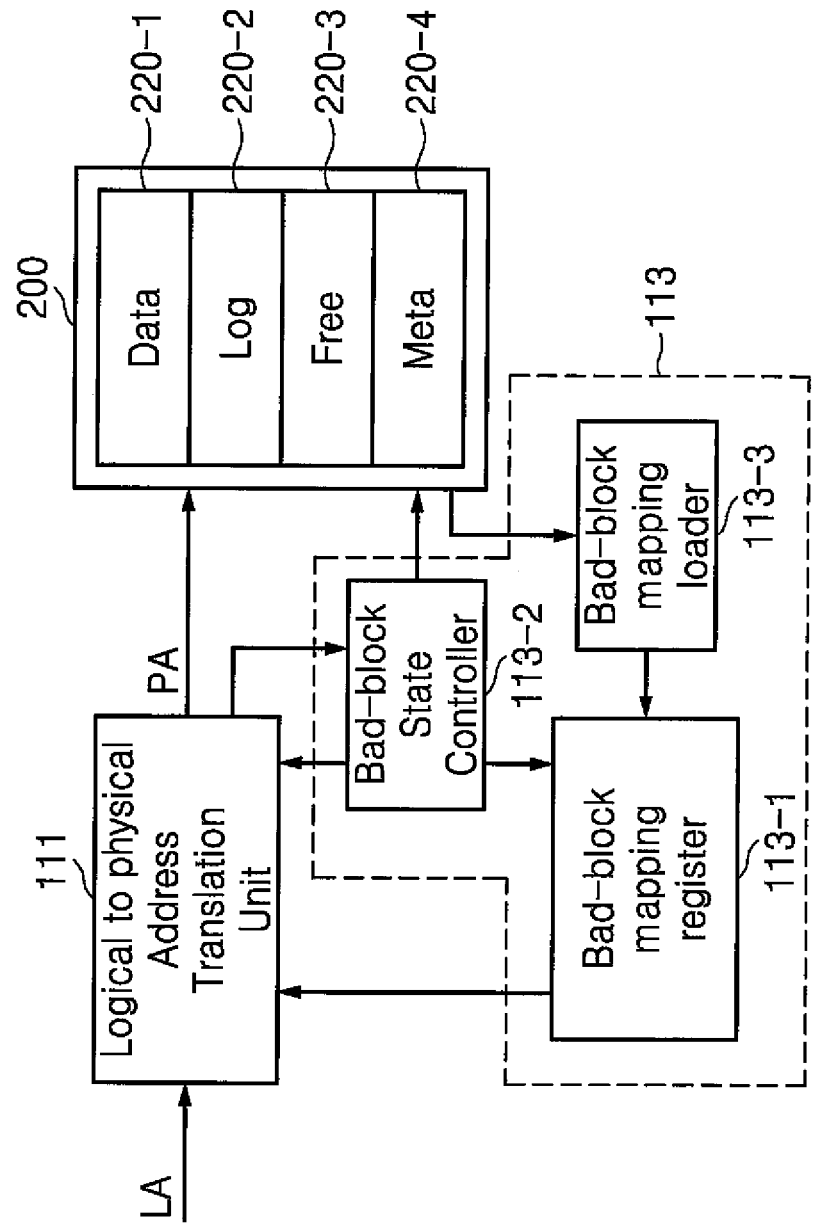
FIG. 6A is a block diagram illustrating a bad-block management unit according to an embodiment of the inventive concept.
Figure 6B:
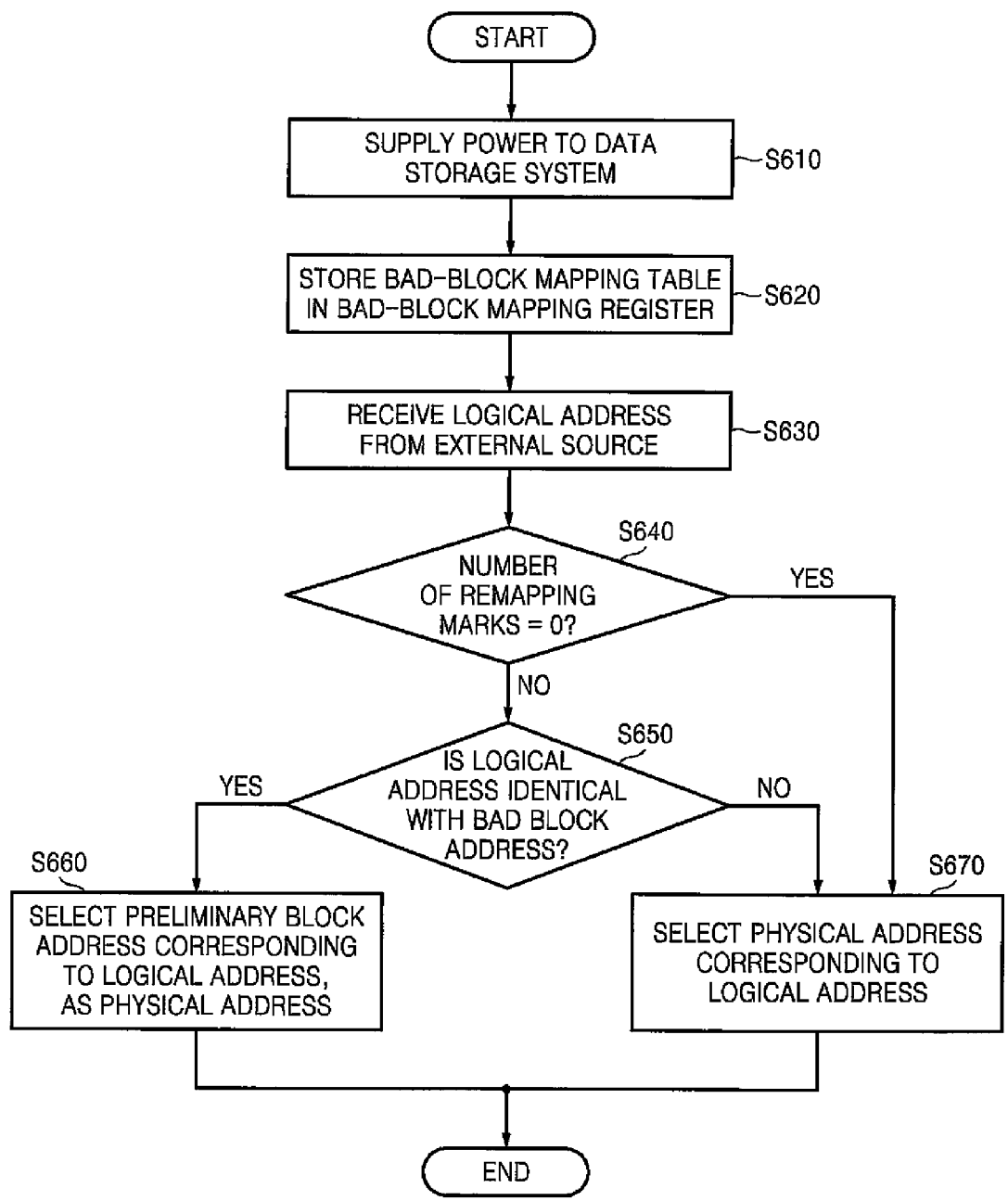
FIG. 6B is a flowchart summarizing one possible approach to the operation of the bad-block management unit of FIG. 6A.

FIGS. 6A and 6B are respectively a block diagram and a flowchart that taken together further illustrate the operation of bad-block management unit 113 of FIG. 2.

Referring to FIGS. 1 through 6A, the logical to physical address translation unit 111 translates the logical address LA to the physical address PA on the basis of the mapping address table. At this time, the logical to physical address translation unit 111 may refer to bad block information provided by the bad-block management unit 113.

The bad-block management unit 113 may include a bad-block mapping register 113-1 in which a bad-block mapping table is stored, a bad-block mapping loader 113-3 for loading bad block information stored in the non-volatile memory device 200 to the bad-block mapping register 113-1, and a bad-block state controller 113-2 for generating a remapping mark flag on the basis of the number of remapping marks stored in the bad-block mapping register 113-1 and transmitting the remapping mark flag to the logical to physical address translation unit 111.

As described above, a bad block may be generated during the manufacture or use of a memory device, and information about the bad block may be stored in an arbitrary region (e.g., the meta block 220-4) of the non-volatile memory device 200. In other words, the information about the bad block may be stored in the meta block 220-4 in the form of a bad-block mapping table. The bad-block mapping table may include a remapping mark representing whether a specific block normally operates, the physical address of the specific block, a preliminary block address corresponding to the physical address, and the like.

The bad-block mapping register 113-1 may include a plurality of registers and store the bad-block mapping table. On the basis of the bad-block mapping table stored in the bad-block mapping register 113-1, the logical to physical address translation unit 111 may compare a logical address LA received from an external source with a bad block address of the bad-block mapping table. For example, the logical to physical address translation unit 111 may perform the comparison a number of times corresponding to the number of remapping marks of the bad-block mapping table.

The logical to physical address translation unit 111 may select the received logical address or preliminary block address as the physical address on the basis of a result of the comparison and the information about the bad block. If the number of remapping marks is 0, no bad blocks exist in a memory, and thus a physical address identical with the logical address may be applied regardless of the comparison with respect to the received logical address. If the logical address is identical with the physical address and the number of remapping marks is 1 or more, the logical to physical address translation unit 111 may select a preliminary block address provided from the bad-block mapping register 113-1 and output the selected preliminary block address as the physical address.

The bad-block state controller 113-2 may generate and output a remapping mark flag necessary for the address selection operation of the logical to physical address translation unit 111. If the number of remapping marks stored in the bad-block mapping register 113-1 is 1 or more, the remapping mark flag may be set to be logic high.

The bad-block mapping loader 113-3 loads information about the bad block stored in the non-volatile memory device 200 to the bad-block mapping register 113-1, during initial booting. In other words, when access to the flash memory is completed, the information about the bad block may be transferred from the bad-block mapping register 113-1 to the meta block 220-4. Even when the flash memory is powered off, the bad-block mapping table corresponding to the information about the bad block stored in the non-volatile memory device 200 is not erased. Thus, during booting of the flash memory, the bad-block mapping table may be transmitted from the meta block 220-4 to the bad-block mapping register 113-1 via the bad-block mapping loader 113-3.

FIG. 6B is a flowchart of the operation of the bad-block management unit 113-3. Referring to FIGS. 1 through 6B, first, the data storage system 1 is supplied with power to start booting (S610). When the data storage system 1 is powered off, the bad block information stored in the bad-block mapping register 113-3 is erased, and thus the selection of a logical address as a physical address is not performed. However, the bad-block mapping table stored in the meta block 220-4 is not erased but is retained.

When the data storage system 1 is booted, the bad-block mapping table stored in the meta block 220-4 is stored in the bad-block mapping register 113-1 (S620). The bad-block mapping loader 113-3 may access the mapping table of the meta block 220-4 and load the mapping table to the bad-block mapping register 113-1.

When the logical address is received from an external source (S630), the bad-block state controller 113-2 may count the number of remapping marks of the bad block mapping table stored in the bad-block mapping register 200 (S640).

If the number of remapping marks is 0 (S640=YES), the logical to physical address translation unit 111 may select the physical address corresponding to the logical address (S670).

On the other hand, if the number of remapping marks is not 0 (S640=NO), the bad-block state controller 113-2 may generate a remapping mark flag. In response to the remapping mark flag, the logical to physical address translation unit 111 may determine whether the logical address is identical with a bad block address (S650). If the logical address is not identical with the bad block address, the operation S670 may be repeated. On the other hand, if the logical address is identical with the bad block address, the logical to physical address translation unit 111 may select a preliminary block address corresponding to the logical address, as the physical address (S660).

FIG. 7 is a conceptual diagram comparing the operating speed for a conventional SSD controller with the operating speed of SSD controller 100 according to an embodiment of the inventive concept.

Referring to FIGS. 1 through 7, operation sequence (A) simply illustrates a process in which a conventional SSD controller processes a host command queue including three (3) read or write operations using a single address translation engine. As may be seen from sequence (A) of FIG. 7, due to the use of the single address translation engine, parallel instruction processing is impossible. Thus, a significant amount of time extending from $t_0$ to $t_2$ is required to process the host command.

However, as comparatively illustrated in operation sequence (B) of FIG. 7, the SSD controller 100 according to an embodiment of the inventive concept processes a plurality of instructions in parallel (i.e., at least substantially overlapping if not simultaneously) using the plurality of address translation CPUs 110, thereby significantly reducing the amount of time (e.g., only $t_0$ to $t_1$) required to process the instructions.

Figure 8:
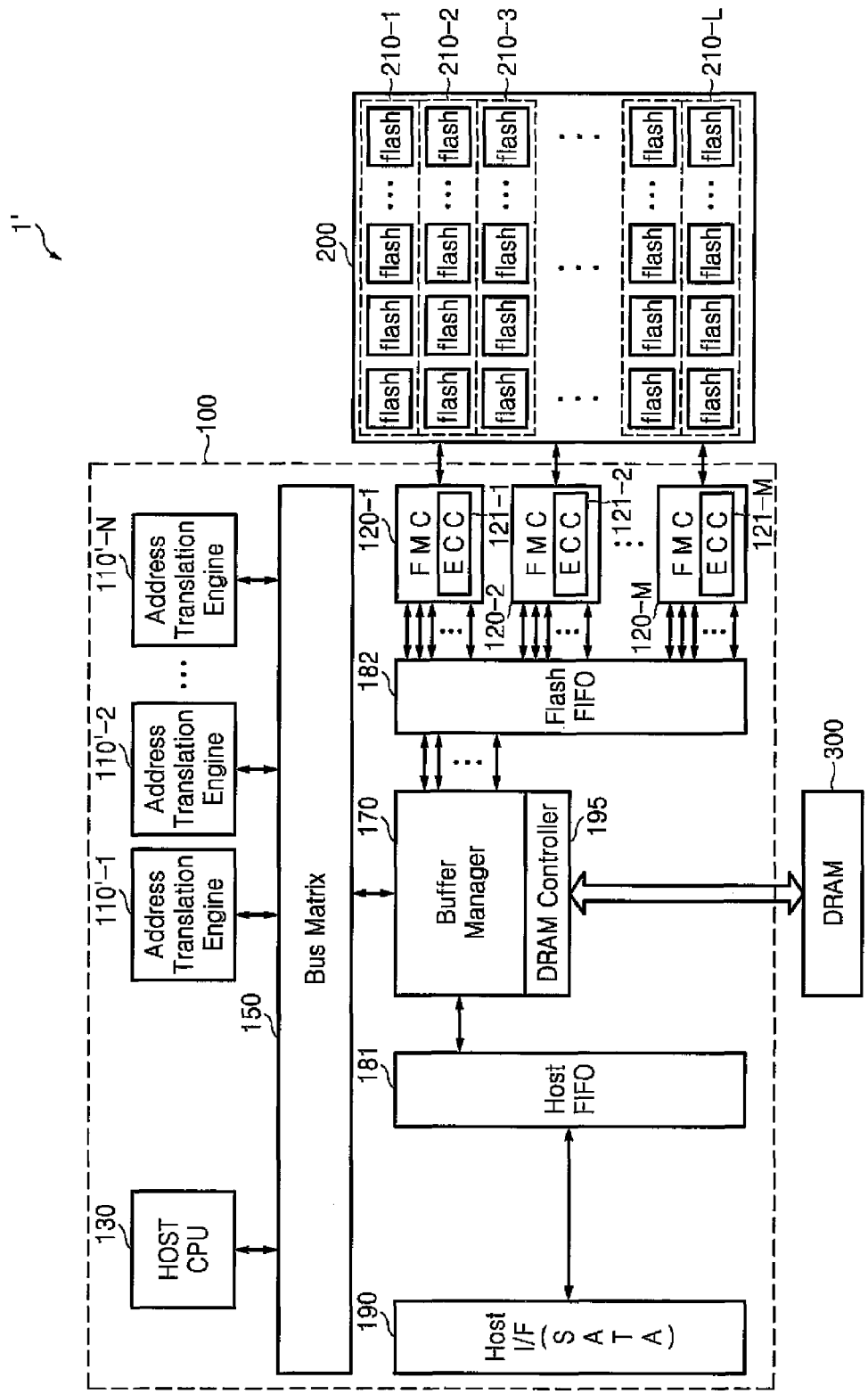
FIG. 8 is a block diagram of a data storage system according to another embodiment of the inventive concept.

FIG. 8 is a block diagram of a data storage system 1' according to another embodiment of the inventive concept. Although the data storage system 1 of FIG. 1 includes the plurality of address translation CPUs 110, the data storage system 1' of FIG. 8 may include a plurality of address translation engines 110' implemented into dedicated hardware. Thus, the address translation engines 110' may be implemented at an IP level. In this case, the data memories 162-1, 162-2, . . . 162-N, and 163, the instruction memories 161-1 and 161-2, and the IPC 140 of FIG. 1 may not be necessary. The other components included in the data storage system 1' are substantially the same as those of the data storage device 1 of FIG. 1, and thus a detailed description thereof will be omitted.

Embodiments of the inventive concept may be variously embodied in whole or in part as computer readable code(s) on a computer readable recording medium. The computer readable recording medium is any data storage device that can store data which can be thereafter read by a computer system.

A SSD controller according to an embodiment of the inventive concept may increase the IPOS. In addition, the SSD controller according to an embodiment of the inventive concept may increase the performance of a semiconductor memory system by processing instructions received from (e.g.) a NCQ in parallel.

While the present inventive concept has been particularly shown and described with reference to exemplary embodi-

What is claimed is:

1. A controller controlling a non-volatile memory device comprising a plurality of flash memory chips accessed via a plurality of channels extending between the controller and the non-volatile memory device, the controller comprising:
- a plurality of address translation central processing units (CPUs), each configured to perform logical-physical address translation with respect to at least one of the plurality of channels, wherein each address translation CPU comprises;
  - an address translation unit that translates a logical address received from the host into a corresponding physical address,
  - a wear leveling unit that performs a wear leveling operation on the memory cells of the non-volatile memory device and provides resulting wear level information, and
  - a bad-block management unit that manages bad blocks of the non-volatile memory device and provides bad block information, and
  - each address translation CPU is configured to change an address mapping table including the logical address and the physical address in response to at least one of the wear leveling information and the bad block information; and
- a plurality of flash memory controllers, each configured to control an access operation related to at least one of the plurality of channels in response to a control signal output from at least one of the plurality of address translation CPUs.

2. The controller of claim 1, wherein each one of the plurality of channels connects a memory group comprising at least one of the plurality of flash memory chips.

3. The controller of claim 2, wherein the memory group comprises a plurality of flash memory chips sharing at least one common input/output (I/O) pin associated with a respective channel.

4. The controller of claim 1, wherein the plurality of address translation CPUs perform respective logical-physical address translations in parallel with respect to the plurality of channels, wherein the respective logical-physical address translations do not overlapped one another.

5. The controller of claim 1, wherein the bad-block management unit comprises:
- a bad-block mapping register configured to store a bad-block mapping table;
- a bad-block mapping loader configured to load bad block information stored in the non-volatile memory device to the bad-block mapping register; and
- a bad-block state controller configured to generate a remapping mark flag on the basis of the number of remapping marks stored in the bad-block mapping register and transmitting the remapping mark flag to the address translation unit.

6. The controller of claim 5, wherein the bad-block state controller is further configured to provide the remapping mark flag set to high if a number of remapping marks stored in the bad-block mapping register is 1 or more, and
the address translation unit is further configured to select a free block address as a physical address in response to the remapping mark flag being set to high.

7. The controller of claim 1, wherein the wear leveling unit is further configured to sequentially scan erase count information for blocks included in the non-volatile memory device and provide scanned erase count information to the address translation unit.

8. The controller of claim 7, wherein the address translation unit is further configured to select as the physical address, an address of a block having a relatively low erase count from among the blocks included in the non-volatile memory device by referring to the scanned erase count information.

9. The controller of claim 1, further comprising:
- a host CPU configured to process instructions received from a host, wherein the host CPU is further configured to determine priorities among the instructions and distribute the instructions to the plurality of address translation CPUs according to the determined priorities.

10. The controller of claim 9, further comprising:
- an inter-processor communication (IPC) module configured to control communication between the host CPU and the plurality of address translation CPUs.

11. The controller of claim 1, wherein each one of the plurality of flash memory controllers comprises an error correction coder configured to perform error correction coding on data retrieved from the non-volatile memory device during a read operation.

12. The controller of claim 1, further comprising:
- a buffer comprising a mapping table in which logical addresses and physical addresses are recorded; and
- a bus matrix configured to provide a path through which the plurality of address translation CPUs access the buffer.

13. The controller of claim 12, wherein each of the plurality of address translation CPUs accesses the buffer via the bus matrix according to a time-sharing method.

14. The controller of claim 1, further comprising:
- an instruction memory block in which the instructions allowing the plurality of address translation CPUs to perform the logical-physical address translations are stored,
- wherein the instruction memory block is shared between the plurality of address translation CPUs.

15. A controller controlling a non-volatile memory device comprising a plurality of channels, the controller comprising:
- a plurality of address translation central processing units (CPUs), each configured to perform logical-physical address translation with respect to at least one of the plurality of channels, wherein each of the plurality of address translation CPUs comprises:
  - an address translation unit configured to translate a logical address received from the host into a corresponding physical address;
  - a wear leveling unit configured to perform a wear leveling operation on the non-volatile memory device and provide resulting wear level information to the address translation unit; and
  - a bad-block management unit configured to manage bad blocks included in the non-volatile memory device and provide bad block information to the address translation unit,
- wherein each address translation CPU is configured to change an address mapping table including the logical address and the corresponding physical address in response to at least one of the wear leveling information and the bad block information; and
- a plurality of flash memory controllers, each configured to control an access operation related to one of the plurality of channels in response to a control signal output from one of the plurality of address translation CPUs.

16. The controller of claim 15, wherein the bad-block management unit comprises:

a bad-block mapping register configured to store a bad-block mapping table;
a bad-block mapping loader configured to load bad block information stored in the non-volatile memory device to the bad-block mapping register; and
a bad-block state controller configured to generate a remapping mark flag on the basis of the number of remapping marks stored in the bad-block mapping register and transmitting the remapping mark flag to the address translation unit.

17. The controller of claim 16, wherein the bad-block state controller is further configured to provide the remapping mark flag set to high if a number of remapping marks stored in the bad-block mapping register is 1 or more, and
the address translation unit is further configured to select a free block address as a physical address in response to the remapping mark flag being set to high.

18. The controller of claim 15, wherein the wear leveling unit is further configured to sequentially scan erase count information for blocks included in the non-volatile memory device and provide scanned erase count information to the address translation unit.

19. The controller of claim 18, wherein the address translation unit is further configured to select as the physical address, an address of a block having a relatively low erase count from among the blocks included in the non-volatile memory device by referring to the scanned erase count information.

20. The controller of claim 15, further comprising:
a host CPU configured to process instructions received from a host, wherein the host CPU is further configured to determine priorities among the instructions and distribute the instructions to the plurality of address translation CPUs according to the determined priorities.

21. The controller of claim 20, further comprising:
an inter-processor communication (IPC) module configured to control communication between the host CPU and the plurality of address translation CPUs.

22. The controller of claim 15, wherein each one of the plurality of flash memory controllers comprises an error correction coder configured to perform error correction coding on data retrieved from the non-volatile memory device during a read operation.

23. The controller of claim 15, further comprising:
a buffer comprising a mapping table in which logical addresses and physical addresses are recorded; and
a bus matrix configured to provide a path through which the plurality of address translation CPUs access the buffer.

24. The controller of claim 23, wherein each of the plurality of address translation CPUs accesses the buffer via the bus matrix according to a time-sharing method.

25. The controller of claim 15, further comprising:
an instruction memory block in which the instructions allowing the plurality of address translation CPUs to perform the logical-physical address translations are stored,
wherein the instruction memory block is shared between the plurality of address translation CPUs.

26. The controller of claim 15, wherein the plurality of address translation CPUs and the plurality of flash memory controllers are correlated one-for-one.

27. A data storage device comprising:
a non-volatile memory device comprising a plurality of flash memory devices accessed via a plurality of channels;
a controller configured to operatively implement a flash translation layer (FTL) performing logical-physical address translation for the entire plurality of flash memory devices and comprising a plurality of address translation central processing units (CPUs); and
a random access memory that stores an address mapping table including address mapping information used by the controller to perform the logical-physical address translation for the entire plurality of flash memory devices,
wherein each one of the plurality of address translation CPUs comprises:
an address translation unit that performs a logical-physical address translation with respect to one channel among the plurality of channels, and independently stores a portion of the address mapping table related to flash memory devices connected by the one channel,
a wear leveling unit that performs a wear leveling operation on the flash memory devices connected by the one channel and provides resulting wear level information to the address translation unit, and
a bad-block management unit that manages bad blocks of flash memory devices connected to the one channel and provides bad block information to the address translation unit, and
each one of plurality of address translation CPUs is configured to change the portion of the address mapping table in response to at least one of the wear leveling information and the bad block information; and
a plurality of flash memory controllers, each configured to control an access operation for one of the plurality of channels in response to a control signal output from one of the plurality of address translation CPUs.

28. A data storage system comprising:
a host; and
a data storage device configured to perform a data storage operation in response to instructions received from the host,
wherein the data storage device comprises:
a random access memory that stores an address mapping table including address mapping information used by the controller to perform the logical-physical address translation for the entire plurality of flash memory devices; and
a controller that operatively implements a flash translation layer (FTL) performing logical-physical address translations for the data storage device and comprises a plurality of address translation central processing units (CPUs), wherein each one of the plurality of address translation CPUs comprises:
an address translation unit that performs a logical-physical address translation with respect to one channel among the plurality of channels, and independently stores a portion of the address mapping table related to flash memory devices connected by the one channel,
a wear leveling unit that performs a wear leveling operation on the flash memory devices connected by the one channel and provides resulting wear level information to the address translation unit, and
a bad-block management unit that manages bad blocks of flash memory devices connected to the one channel and provides bad block information to the address translation unit, and
each one of plurality of address translation CPUs is configured to change the portion of the address mapping table in response to at least one of the wear leveling information and the bad block information; and a plurality of flash memory controllers, each configured to control execution of an access operation for one of the plurality of channels in response to a control signal output from one of the plurality of address translation CPUs.

29. A data processing method comprising:

receiving input data and instructions from a host in a controller via a host central processing unit (CPU);

determining priorities for the instructions, and then distributing the instructions to a plurality of address translation central processing units (CPUs) according to the determined priorities;

performing logical-physical address translations using the plurality of address translation CPUs in response to the distributed instructions to generate corresponding physical addresses for the input data;

distributing the input data and the corresponding physical addresses to a plurality of flash memory controllers, wherein each one of the plurality of flash memory controllers is configured to control an access operation for flash memory chips of a non-volatile memory device using at least one of a plurality of channels extending between the controller and the non-volatile memory in response to at least one control signal output by the plurality of address translation CPUs; and by operation of each one of the plurality of address translation CPUs,
loading an address mapping table,
receiving at least one of wear leveling information and bad block information associated with the flash memory chips of the non-volatile memory device; and
changing the loaded address mapping table on the basis of the received at least one of the wear leveling information and the received bad block information.

30. The data processing method of claim 29, wherein loading an address mapping table comprises:

accessing, by operation of each one of the plurality of address translation CPUs, the address mapping table via a bus matrix according to a time sharing method.

31. The data processing method of claim 29, wherein the plurality of address translation CPUs and the plurality of flash memory controllers are correlated one-for-one.

\* \* \* \* \*